United States Patent [19]

Zheng et al.

[11] Patent Number: 5,428,211
[45] Date of Patent: Jun. 27, 1995

[54] POSTNET BAR CODE DECODER

[75] Inventors: Joe Zheng, Brookfield, Conn.; Wenhua Li, Toledo, Ohio

[73] Assignee: United Parcel Service of America Inc., Atlanta, Ga.

[21] Appl. No.: 237,550

[22] Filed: May 2, 1994

[51] Int. Cl.6 .................. G06K 7/10; G06K 19/06
[52] U.S. Cl. .................... 235/462; 235/454; 235/494
[58] Field of Search ............ 235/462, 472, 380, 454

[56] References Cited

U.S. PATENT DOCUMENTS

| | | | |
|---|---|---|---|
| 4,641,018 | 2/1987 | Mazumder et al. | 235/462 |
| 4,822,986 | 4/1989 | Guthmueller et al. | 235/462 |
| 4,874,936 | 10/1989 | Chandler et al. | 235/494 |
| 4,896,029 | 1/1990 | Chandler et al. | 235/494 |
| 4,998,010 | 3/1991 | Chandler et al. | 235/494 |
| 5,073,954 | 12/1991 | Van Tyne et al. | 235/462 X |
| 5,134,272 | 7/1992 | Tsuchiya et al. | 235/462 |
| 5,155,343 | 10/1992 | Chandler et al. | 235/462 |
| 5,233,168 | 8/1993 | Kulk | 235/456 |
| 5,262,623 | 11/1993 | Batterman et al. | 235/454 |
| 5,276,315 | 1/1994 | Surka | 235/462 |
| 5,286,960 | 2/1994 | Longacre, Jr. et al. | 235/463 |
| 5,304,787 | 4/1994 | Wang | 235/462 |
| 5,319,181 | 6/1994 | Shellhammer et al. | 235/462 |

FOREIGN PATENT DOCUMENTS 57-164373 10/1982 Japan ..................... 235/462

Primary Examiner—Donald Hajec
Assistant Examiner—Michael G. Lee
Attorney, Agent, or Firm—Jones & Askew

[57] ABSTRACT

A method and apparatus is provided which decodes Postnet bar code regardless of position or orientation. By scanning the code, deriving transition points, and assuming various angles at orientation, position and orientation is estimated. Fine tuning and error correction is likewise provided. A localized sorting method is also used for decoding to binary status.

40 Claims, 14 Drawing Sheets

THE METHOD TO LOCATE THE POSITION AND ESTIMATE THE ORIENTATION OF A POSTNET BAR CODE $N=3, M=6, T_1=3, T_2=8, T_H=10, T_V=4$ (NEGATIVE SLOPE)

(NEGATIVE SLOPE)

(POSITIVE SLOPE)

(POSITIVE SLOPE)

THE METHOD TO LOCATE THE POSITION AND
ESTIMATE THE ORIENTATION OF A POSTNET BAR CODE $N=3, M=6, T_1=3, T_2=8, T_H=10, T_V=4$

LARGE ANGLE: $N=3, M=6$

MEDIUM ANGLE: N=6, M=3

VERY SMALL ANGLE: N=20, M=1

NORMAL

REVERSAL

LOCATE THE START POINT AND
END POINT AND UPDATE THE ORIENTATION

VERIFICATION OR NORMAL
CODE AND REVERSAL CODE

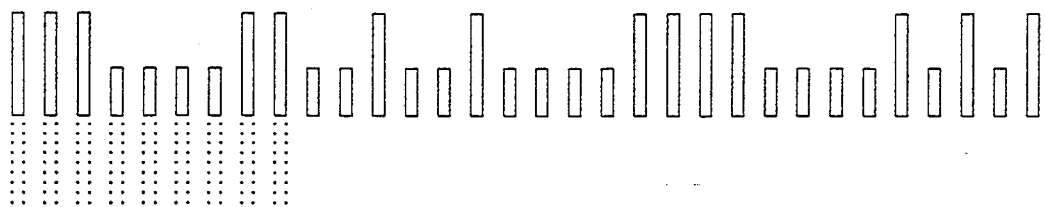
FIG. 11a
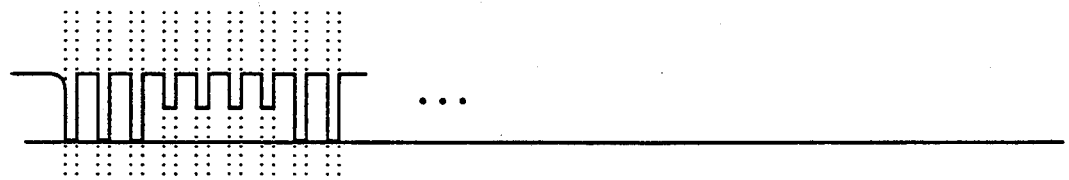
FIG. 11b
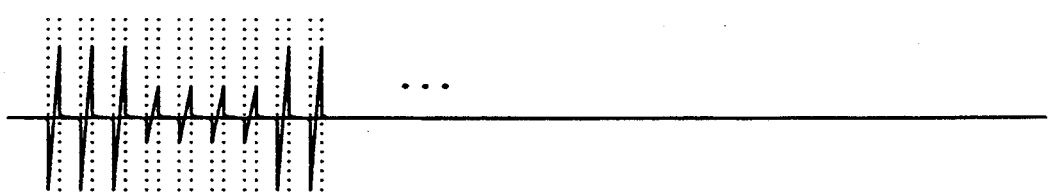
FIG. 11c
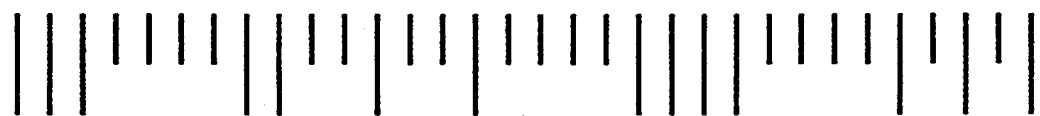
FIG. 11d
1110000110010010000111100001 0101
FIG. 11e

CONVERSION: $X_2 = Y_1$
$Y_2 = X_1$

FIG. 14a

| W | X | Y | Z |
|---|---|---|---|
| 1[0] = -39 | | | |
| 1[1] = -29 | | | |
| 1[2] = -175 | -1140 | 1 | [0] |
| 1[3] = -1140 | | | |
| 1[4] = -351 | | | |
| 1[5] = 1466 | 1466 | | |
| 1[6] = 108 | | | |
| 1[7] = -666 | -1140 | 1 | [1] |
| 1[8] = -1140 | | | |
| 1[9] = 1342 | 1342 | | |
| 1[10] = 513 | | | |
| 1[11] = -377 | -1282 | 1 | [2] |
| 1[12] = -1282 | | | |
| 1[13] = 752 | 921 | | |
| 1[14] = 912 | | | |
| 1[15] = -148 | -508 | 0 | [3] |
| 1[16] = -508 | | | |
| 1[17] = 358 | 358 | | |
| 1[18] = 351 | | | |
| 1[19] = -66 | | | |
| 1[20] = -433 | -433 | 0 | [4] |
| 1[21] = -99 | | | |
| 1[22] = 577 | 577 | | |
| 1[23] = 27 | | | |
| 1[24] = -327 | -451 | 0 | [5] |
| 1[25] = -451 | | | |
| 1[26] = 539 | 539 | | |
| 1[27] = 249 | | | |
| 1[28] = -125 | -557 | 0 | [6] |
| 1[29] = -557 | | | |
| 1[30] = 242 | 458 | | |
| 1[31] = 458 | | | |
| 1[32] = -14 | | | |
| 1[33] = -356 | -414 | 0 | [7] |
| 1[34] = -414 | | | |
| 1[35] = 621 | 621 | | |
| 1[36] = 108 | | | |
| 1[37] = -241 | -1395 | 1 | [8] |
| 1[38] = -1395 | | | |
| 1[39] = 293 | 1248 | | |
| 1[40] = 1248 | | | |
| 1[41] = 72 | | | |
| 1[42] = -528 | -528 | 0 | 9 |
| 1[43] = -18 | | | |
| 1[44] = 532 | 532 | | |
| 1[45] = -13 | | | |
| 1[46] = -641 | -1153 | 1 | 10 |
| 1[47] = -1153 | | | |
| 1[48] = 1262 | 1262 | | |
| 1[49] = 620 | | | |
| 1[50] = -83 | -563 | 0 | 11 |
| 1[51] = -563 | | | |
| 1[52] = 310 | 371 | | |
| 1[53] = 371 | | | |
| 1[54] = -26 | | | |
| 1[55] = -391 | -389 | 0 | 12 |
| 1[56] = -389 | | | |
| 1[57] = 621 | 621 | | |
| 1[58] = 106 | | | |
| 1[59] = -213 | | | |

FIG. 14b

| W | X | Y | Z |
|---|---|---|---|
| h[60] = -504 | -504 | 0 | [13] |
| h[61] = 528<br>h[62] = 193 | 528 | | |
| h[63] = -266<br>h[64] = -1255 | -1255 | 1 | 14 |
| h[65] = 54<br>h[66] = 1280<br>h[67] = 134 | 1280 | | |
| h[68] = -792<br>h[69] = -922 | -922 | 1 | 15 |
| h[70] = 1235<br>h[71] = 502 | 1235 | | |
| h[72] = -173<br>h[73] = -511 | -511 | 0 | 16 |
| h[74] = 489<br>h[75] = 168 | 489 | | |
| h[76] = -240<br>h[77] = -1255 | -1255 | 1 | 17 |
| h[78] = 341<br>h[79] = 1138<br>h[80] = 116 | 1138 | | |
| h[81] = -467<br>h[82] = -187 | -467 | 0 | 18 |
| h[83] = 584 | 584 | | |
| h[84] = -32<br>h[85] = -761<br>h[86] = -990 | -990 | 1 | [19] |
| h[87] = 1401<br>h[88] = 420 | 1401 | | |
| h[89] = -412<br>h[90] = -305 | -412 | 0 | 20 |
| h[91] = 629<br>h[92] = 136 | 629 | | |
| h[93] = -181<br>h[94] = -606 | -606 | 0 | 21 |
| h[95] = 338<br>h[96] = 407 | 407 | | |
| h[97] = -122<br>h[98] = -909<br>h[99] = -667 | -909 | 1 | 22 |
| h[100] = 1292<br>h[101] = 420 | 1292 | | |
| h[102] = -360<br>h[103] = -461 | -461 | 0 | 23 |
| h[104] = 647<br>h[105] = 138 | 647 | | |
| h[106] = -300<br>h[107] = -1372 | -1372 | 1 | 24 |
| h[108] = 576<br>h[109] = 1093<br>h[110] = 13 | 1093 | | |
| h[111] = -468<br>h[112] = -253 | -468 | 0 | 25 |
| h[113] = 680<br>h[114] = 54 | 680 | | |
| h[115] = -361<br>h[116] = -345 | -361 | 0 | 26 |
| h[117] = 556<br>h[118] = 87<br>h[119] = -497 | 556 | | |

POSTNET BAR CODE DECODER

TECHNICAL FIELD

This invention relates in general to a method and apparatus for decoding Postnet bar code, and particularly relates to a method and apparatus for decoding such bar codes which are positioned at random locations and have varying image resolutions, which operates without the aid of preset code location or alignment.

BACKGROUND OF THE INVENTION

To facilitate the automatic sorting and routing of the mail, U.S. Postal regulations allow shippers to enjoy a postage discount if they pre-print the appropriate bar codes on the outgoing mail. One type of bar code is known in the trade as Postnet bar code, which if desired may be used to encode ZIP code information.

The United States Postal Service (USPS) has been using the Postnet bar code for years to facilitate the automatic sorting and routing or mail pieces in the main facilities around the country.

Numerous products that generate and print Postnet bar codes on mail based on the ZIP code have been designed and co-sponsored by USPS. It is presently being claimed that by the year 1995, more than 95% of U.S. mail will carry on such a bar code.

Before the application of such bar code, over 17 people per sorting station could be needed to manually sort and route mail. Regardless of the high missorting rate, it was considered one of the most tedious and labor intensive processes at postal sorting facilities. Since the introduction of Postnet bar codes, the sorting and routing efficiency has been brought up many magnitudes over the manual process. Many stations can process as many as 37,000 pieces per hour with only two people.

Postage regulations dictate the size, configuration, location of the Postnet code on mail. This is to allow prior art apparatuses (such as those believed to be in current use by the USPS) to easily read the code, especially as location and orientation of the code is known. However, such prior art apparatuses are ineffective if the location and angular orientation of the Postnet code is not a constant, but instead random.

As it is anticipated that the Postnet bar code may become more universally accepted for use in packaging and other mailings, and it is anticipated that the code may be so used in a less universal manner, such as being randomly applied to the side of a package. Therefore a need has been recognized to provide a Postnet bar code reading system which recognizes randomly oriented Postnet bar codes, unlike current prior art systems which rely upon consistent location and alignment of the bar code to facilitate reading.

SUMMARY OF THE INVENTION

This document describes a method and apparatus of locating and decoding the Postnet bar code in any direction. Both forward and reversal scanning as well as the identification of tall bars and short bars by a zero crossing method are developed to decode the Postnet bar code at varying image resolutions and angles.

Therefore, it is an object of the present invention to provide an improved system for reading Postnet bar code.

It is a further object of the present invention to provide an improved system for reading Postnet bar code in which different bar codes may be read although they are randomly oriented and inconsistently aligned.

It is a further object of the present invention to provide an improved system for reading Postnet bar code which is simple in operation.

It is a further object of the present invention to provide an improved system for reading Postnet bar code which is efficient in operation.

It is a further object of the present invention to provide an improved system for reading Postnet bar code which is cost-effective in operation.

It is a further object of the present invention to provide an improved system for reading Postnet bar code which is fast in operation.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 11 illustrates a process for identifying tall and short bars and converting the code to binary form.

FIGS. 14A and 14B illustrate a chart of valves associated with that shown in FIG. 11.

DETAILED DESCRIPTION OF THE PREFERRED EMBODIMENTS

Referring now to the figures, a detailed description of the preferred embodiment is now made.

I. General Construction and Operation

Figure 3A:
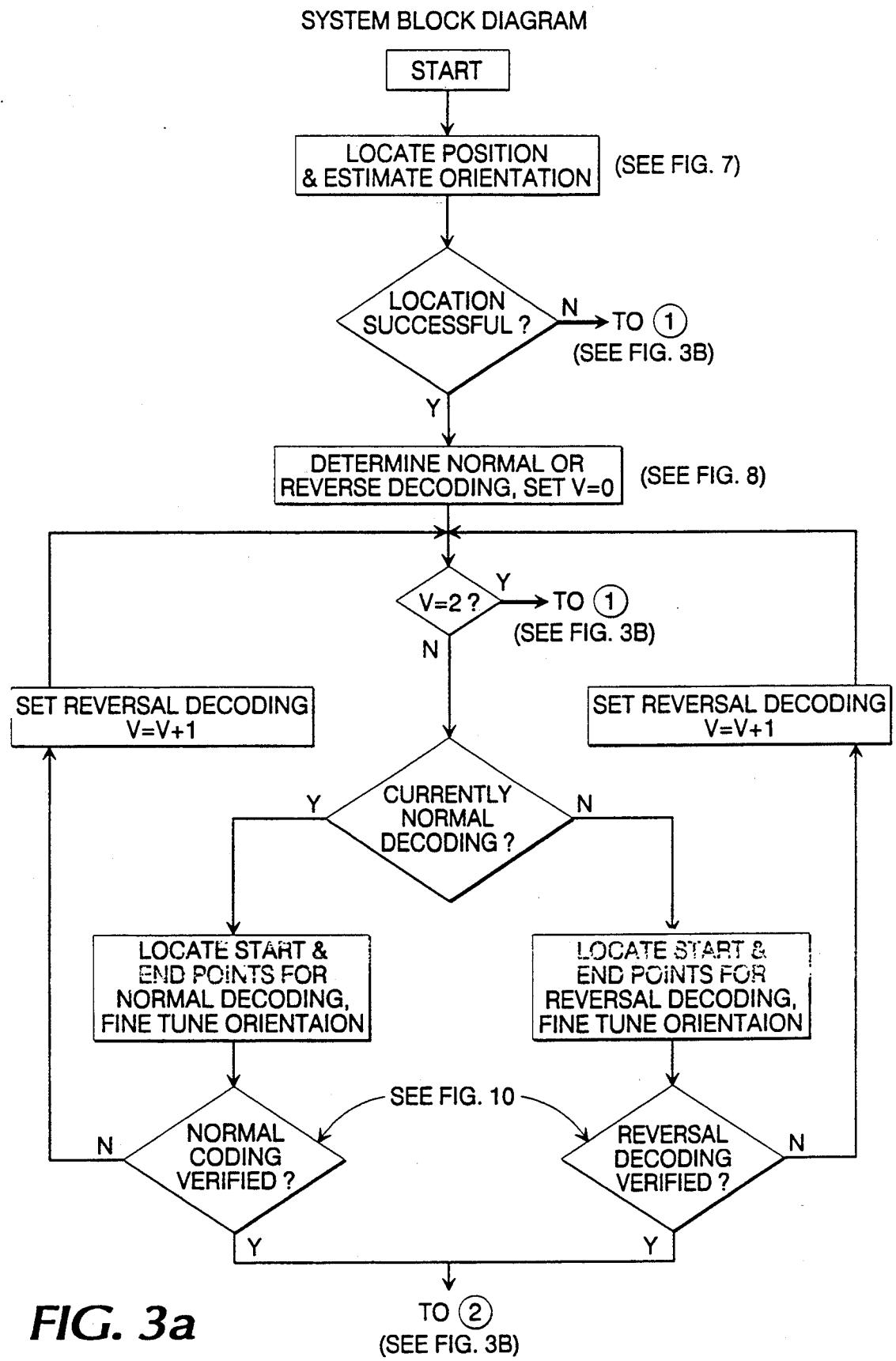
FIGS. 3A and 3B illustrate a flow chart illustrating the operation of an overall process according to the present invention.
Figure 3B:
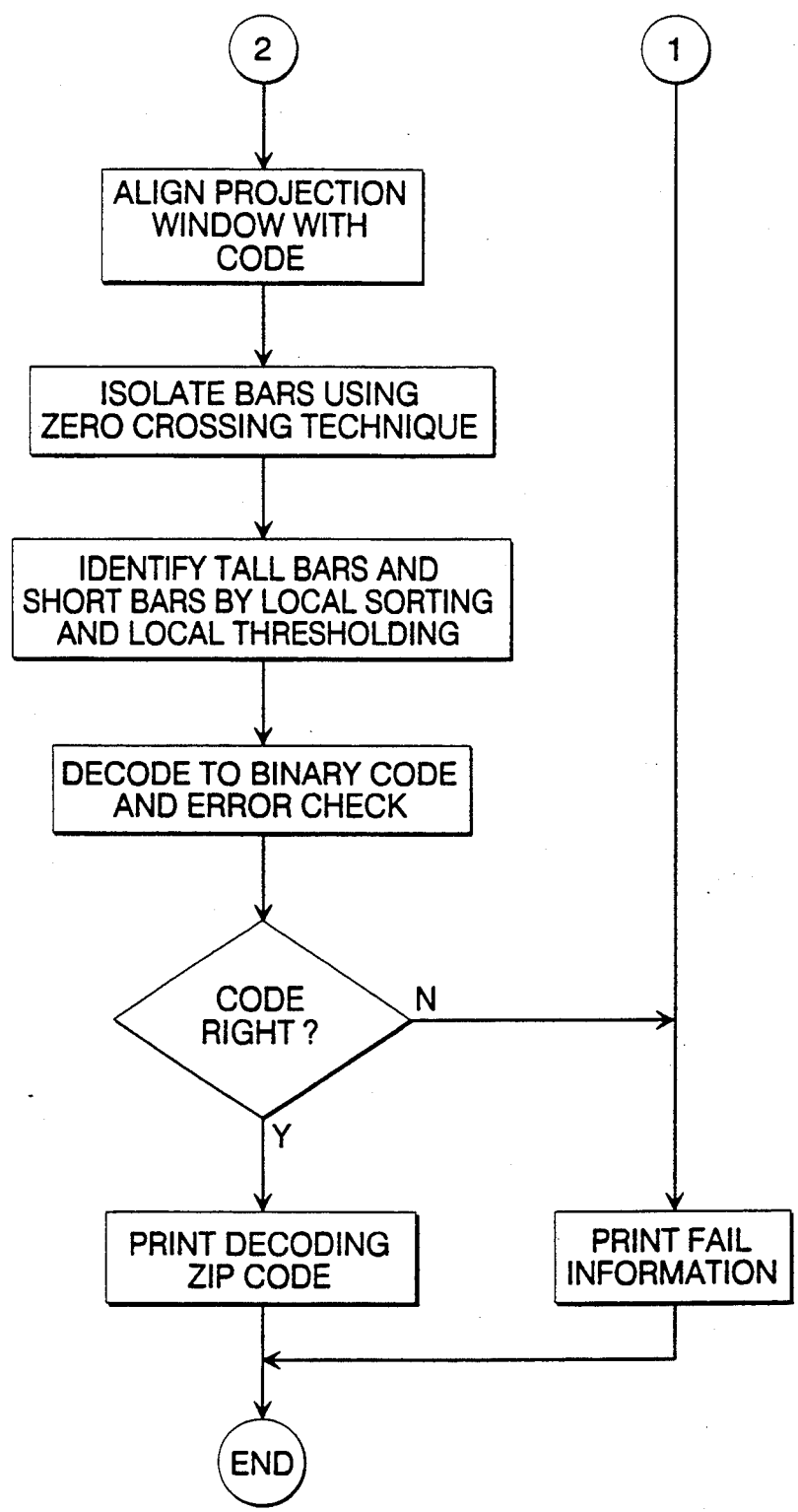
Figure 7:
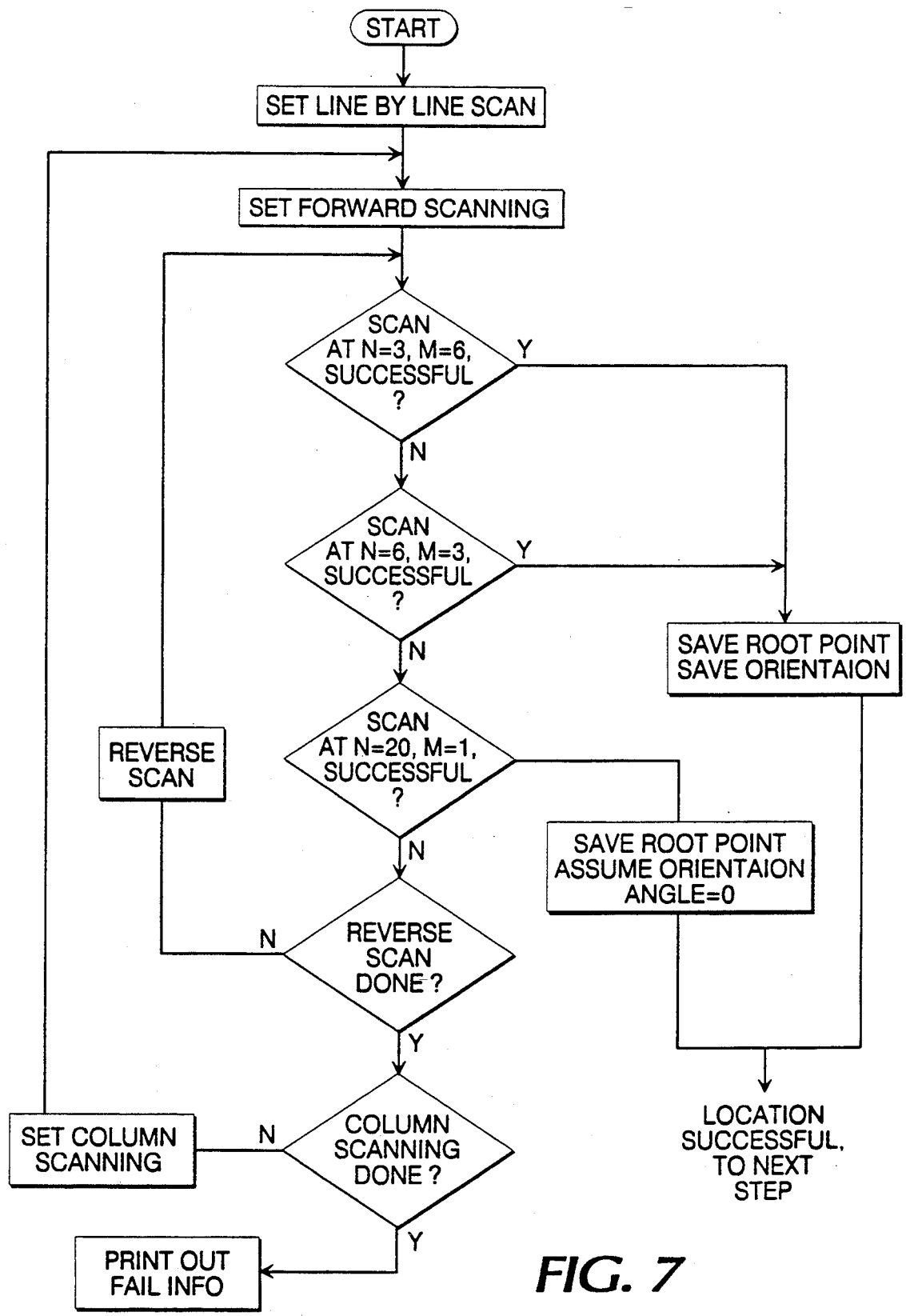
FIG. 7 illustrates a flow chart of a location process according to the present invention.

Reference is generally made to FIGS. 3A, 3B and 7. A method is designed and implemented to locate the position of a Postnet bar code in any location and orientation. Forward scan and reverse scan are employed to locate a set of candidate points. The candidate points are used to estimate the slope and location of the bar code. Further search is conducted to locate the start point and end point of the bar code and the orientation estimate is fine tuned. Three locating schemes are implemented to compose the different characteristics when a Postnet bar code has a large orientation angle, a medium orientation angle and a small orientation angle. The order of the three locating schemes is specially designated to enhance the accuracy and makes the said decoder work for different Postnet bar code formats at varying image resolutions and omnidirection.

II. More Detailed Discussion

A. The Postnet Code and Problems With Its Random Orientation

Figure 1:
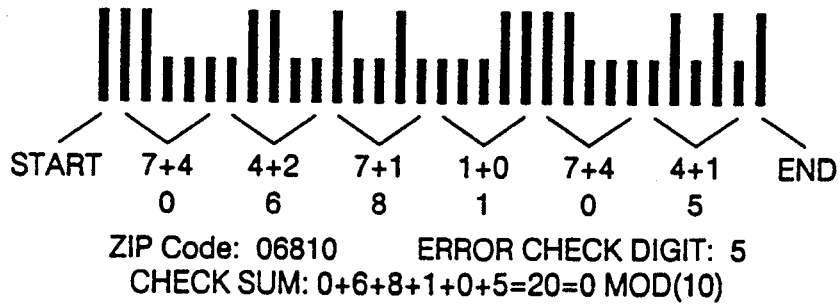
FIG. 1 is an illustrative of Postnet bar code

Referring to FIG. 1, Postnet bar code is a linear, black, tall bar and short bar code printed on the mail pieces. The code can comprise different number of digits representing ZIP,ZIP+4 and ZIP+4+2 address information respectively. Each representation is regarded as a Postnet bar code format. An extra digit is used for error checking.

Each code digit has five bars in a 2/5 configuration, that is, two tall bars and three short bars. The weights associated with each bar position are 7, 4, 2, 1, 0 respectively. If the sum of five position weights is larger than 10, the value of the digit is set to 0. A sequence of said bar code characters is preceded by a single tall bar indicating the start and followed by a single tall bar indicating the end of the Postnet bar code. FIG. 1 illustrates a Postnet bar code representing zip code 06810, with an error checking numeral, being 5.

When the Postnet bar code is printed in the horizontal direction, the unique pattern structure makes it easy to be located. This can be accomplished by simply comparing the transition number within a scan line a predefined threshold.

However, when the Postnet bar code is printed in any orientation, the location of the bar code becomes more complicated. FIG. 2 shows several Postnet bar codes at different orientations. Generally, there is not enough transition numbers within one scan line to separate bar codes from text and noise. Because Postnet bar codes are composed of both tall bars and short bars, it is also necessary to distinguish between two symmetric configurations as shown in FIG. 2(*a*) and (*b*) or (*c*) and (*d*). For the bar codes shown in FIG. 2(*a*) and (*c*), their start bar is at the left side of their end bar. They are defined as normal code. For the bar codes shown in FIG. 2(*b*) and (*d*), their start bar is at the right side of their end bar. Therefore, they are called reversal code. As may be understood, the codes shown in FIGS. 2(*a*) and 2(*d*), may be read by "normal scanning", that is, from left to right and top to bottom. For the codes shown in FIGS. 2(*b*) and 2(*c*), they may be read by "reverse scanning", that is, from right to left and top to bottom.

B. Scanning Image and Converting to Numerical Array

In order to facilitate processing, numerical data in the form of a two-dimensional data array (e.g. horizontal rows and vertical columns) is first obtained. A two dimensional array is for the purposes of this application considered to be provided by vector coordination such as known in the art.

Providing such a data array may be done by placing the package on a conveyor, and allowing the conveyor to move the package underneath an over-the-belt camera or by taking a snapshot of the package surface. Gray-scale data is then obtained from CCD technology as known in the art to create the numerical array. This array may then be "scanned" line by line (or column by column) as discussed below.

In one preferred embodiment, the image resolution is 100 dpi, that is, 100 individual pixels per inch. That is, individual pixel dimensioning is 0.01"×0.01". However, other image resolution may also be provided without departing from the spirit and scope of the present invention. Some reasonable experimentation may be helpful.

C. Locating the Position and Estimating Orientation of the Postnet Code

After the data array is established, the first step in the process is to locate the position of the code and to roughly estimate its location and orientation.

General Operation

Figure 4:
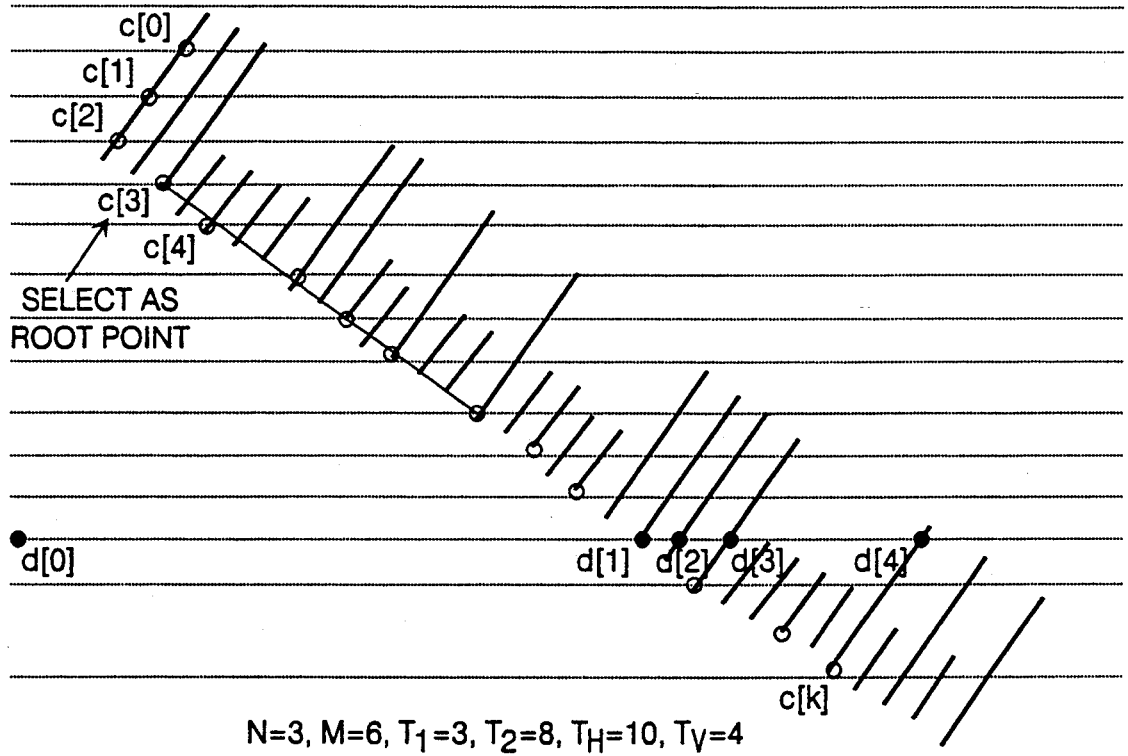
FIG. 4 is an illustration of the scanning process used to locate the position and estimate the orientation of a Postnet bar code.

The data array is scanned line by line as shown in FIG. 4. Every line may be scanned, but depending on resolution, every line may be scanned, or regularly spaced-apart lines may be scanned. Each scan line is analyzed to see whether it contains elements that may be part of a Postnet bar code. This is accomplished by looking for a predetermined number of transitions (between black and white) that are separated by distances that correspond to the possible angular orientations. To locate the location of a transition point (for example from white to black), a comparision is made of a first pixel value to a second pixel value. If the difference between these values is greater than a predefined threshold, such as 128, one of the pixels is assigned "transition" status. It should be understood that either the first or second pixel could be assigned transition status, as long as this designation is consistent throughout the designation of transition points.

Figure 5A:
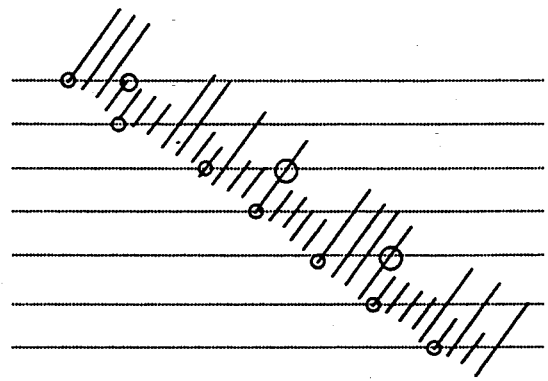
FIG. 5 illustrates different selections of N and M for difference orientation angles.
Figure 5B:
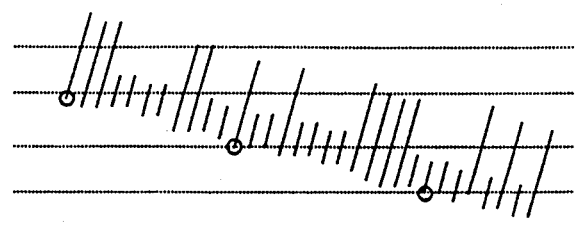
Figure 5C:
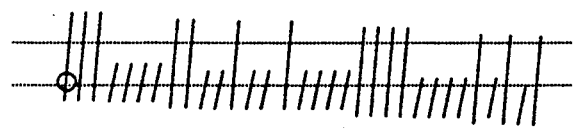

In order to account for various angular orientations of the code, the process first assumes the bar code is at large angle (See FIG. 5) and suitable for forward scanning (See also FIG. 7). If based on this assumption the process is not able to locate the position of the bar code, then the process assumes that the bar code is at a medium angle and suitable for forward scanning. If based on this second assumption the process is not able to locate the position of the bar code, then the process assumes that the bar code is at an even smaller angle approaching zero and suitable for forward scanning. If based on this third assumption the process is not able to locate the position of the bar code, the process assumes that reverse scanning is needed.

Once reverse scanning is selected, the process assumes that the bar code is at a large angle and suitable for reverse scanning. If based on this assumption the process is not able to locate the position of the bar code, then the process assumes that the bar code is at a smaller angle and suitable for reverse scanning. If based on this second assumption the process is not able to locate the position of the bar code, then the process assumes that the bar code is at an even smaller angle approaching zero and suitable for reverse scanning. If based on this third assumption the process is not able to locate the position of the bar code, the rows and columns of the data image are swapped, and the above process is repeated. If the process again fails, fail information is printed. The bar code is then read manually or reprocessed after repair, cleaning, etc.

If at any time the process locates the position of the bar code, the root point and the orientation are then stored. If location was done while assuming a large or medium angle, the orientation angle is calculated as discussed below. If location was done while assuming a small angle, the orientation angle is assumed to be zero.

Therefore, at this stage the location of the bar code has been established by the establishment of a root point and an estimate angular orientation of the bar code has been established by locating and processing the relative positions of candidate points.

Example of Operation

Figure 12A:
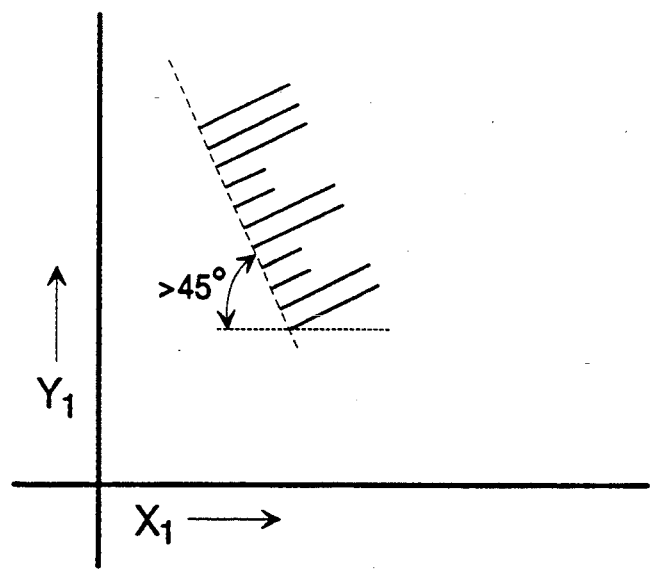
FIGS. 12A and 12B illustrate the swapping of rows and columns of the data image.
Figure 12B:
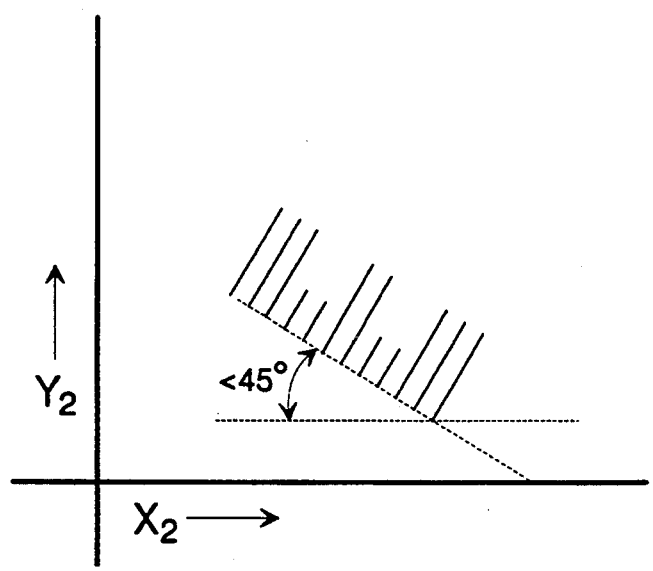

Regardless of normal or reversal code, the orientation angle of a Postnet bar code can range from 0 to 90 degrees. If the orientation angle is larger than 45 degrees, the rows and columns of the data image are swapped as shown from FIG. 12a to FIG. 12b. Note that all codes shown in FIGS. 2a–2d have orientation angles less than 45°. In other words, data scanning is then done column by column instead of line by line. Thus, in the following discussions, we assume an orientation angle less than 45 degrees and scanning done line by line.

Reference is now made to FIG. 4. As discussed above, the data image is scanned line by line. During each scan, a calculation is made to determine if it includes a "candidate point". To perform this calculation, the following variables are used:

Array d—the transition points at which pixel value changes from white to black with d[0] always equal to 0.

Array c—An array of candidate points having an array size k.

$T_1$—the smallest possible distance between transition points for the bar code. This is dependent upon the standard configuration of the bar code as well as its assumed angular orientation.

$T_2$—the largest possible distance between transition points for the bar code. This is dependent upon the standard configuration of the bar code as well as its assumed angular orientation.

$T_H$—the quiet zone length in the horizontal direction. This is the length at which the algorithm may expect "quiet" before encountering a transition point.

$T_r$—the quiet zone length in the vertical direction. This is the length at which the algorithm may expect "quiet" before encountering a transition point.

N—The least number of transition points in a scanned line required to create a candidate point on that line.

M—The least number of candidate points in the same slope line.

If within one line there are N consecutive transitions which satisfy the two inequalities:

$$d[j]-d[j-1] > T_H \quad T_1 < d[i+1] = d[i] < T_2 \quad i = j, j+1, \ldots, j+N+1.$$

then we record d[i] as a current potential point and is assigned to C[0]. This process is repeated until a number of candidate points are obtained and stored as an array c. To test if these candidate points are on the same line, the M consecutive candidate points are selected and the following calculation is made:

the slope calculation is as follows:

$$s[i] = \frac{y(i) - y(i+1)}{x(i) - x(i+1)} \quad \begin{array}{l}\text{(vertical difference)}\\\text{(horizontal difference)}\end{array}$$

where $i = j, j+1, \ldots, j+M-1$, with $j = 0, 1, \ldots, k-M$, and $x(i)$ and $y(i)$ are x and y coordinates of c[i].

If for some j the maximum absolute difference between any two values from the "slope" array s of the consecutive candidate points is less than a predefined error limit, then we conclude that these M candidate points are on the Postnet bar code, and the first point c[j] is selected as the root point for the following processing. An estimate of the orientation for the bar code is also made by calculating the slope of the line connecting the first point and the last point of the above M consecutive points.

As may be understood, the value selections of parameter N and M depend on the bar code orientation. When the orientation angle is small, there are only a few candidate points that will lie on a line. Thus, M has to be small to avoid missing the bar code. Similarly, N has to be large enough to discard those points not in the bar code. When the angle is very small, M is reduced to 1 and N is selected as the threshold 20 when the angle is approaching 0 (horizontal orientation). The different selections of N and M are demonstrated in FIG. 5.

Figure 13A:
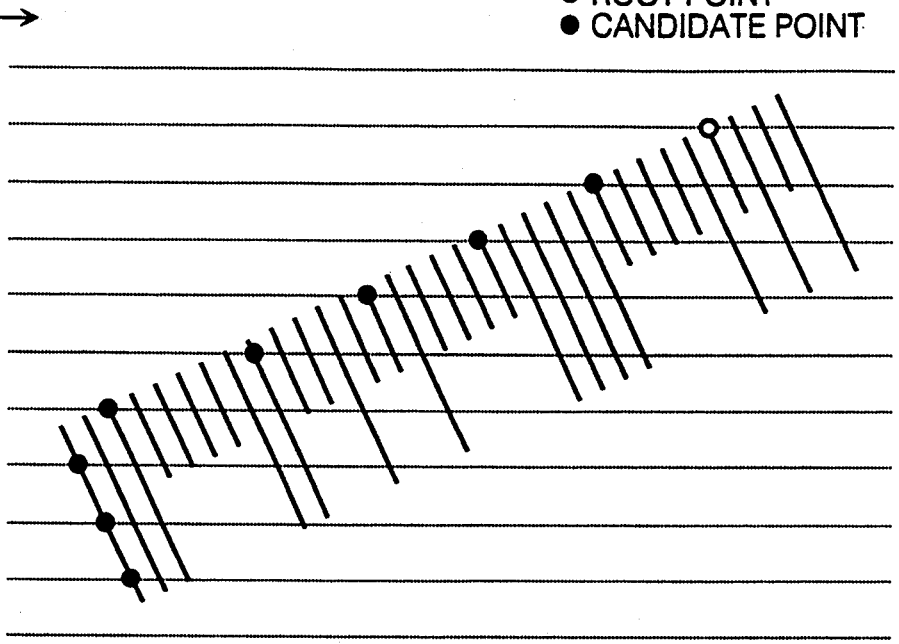
FIGS. 13A and 13B illustrate results of forward and reverse scanning.
Figure 13B:
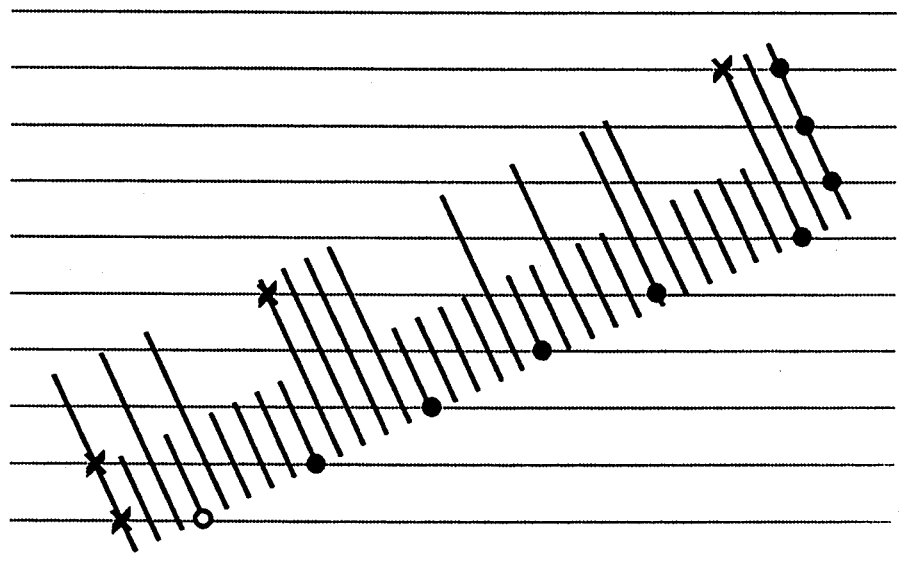

As mentioned before, Postnet bar code is composed of tall bars and short bars. If it is scanned by forward scanning as shown in FIG. 13b, the bar code may not be located because there may not be enough points which satisfy the requirements of a candidate point. To this problem, reverse scanning is introduced if forward scanning fails. The above presentation is summarized in FIG. 7 to further clarify the location algorithm. Note we use N=3, M=6 for large orientation angle, N=6, M=3 for small orientation angle and N=20, M=1 for a very small orientation angle.

For this process, it has been found advantageous to use lines of scan which will allow a short bar, even when positioned at 45°, to provide a minimum of one transition point. Therefore, it may be understood that for code having short bars having a length, data scanning will be done along rows spaced apart no less than 0.707 times the short bar length.

C. Determine Normal Decoding or Reversal Decoding

Figure 2A:
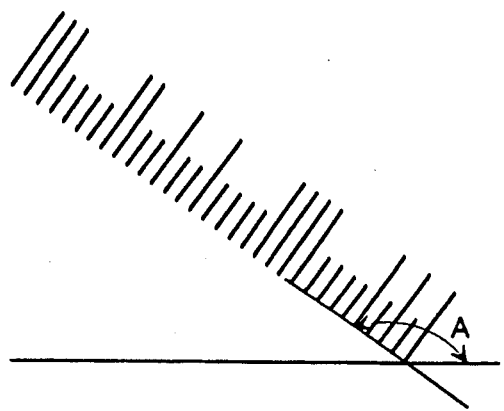
FIG. 2 is an illustration of Postnet bar codes at differing orientations.
Figure 2B:
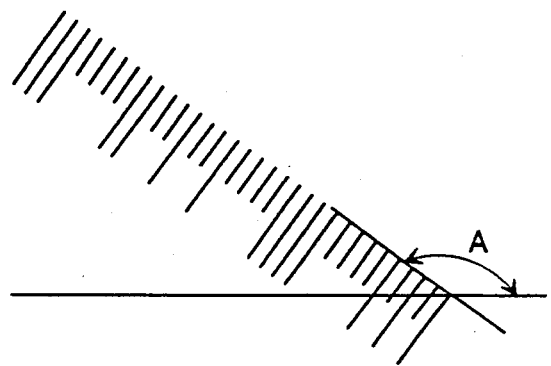
Figure 2C:
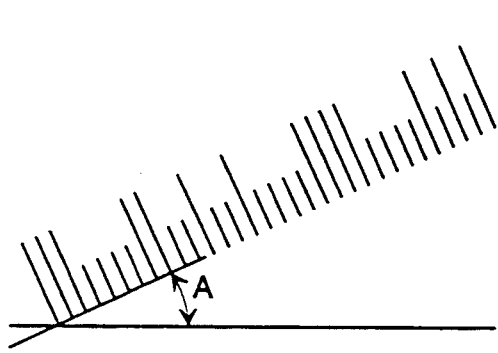
Figure 8A:
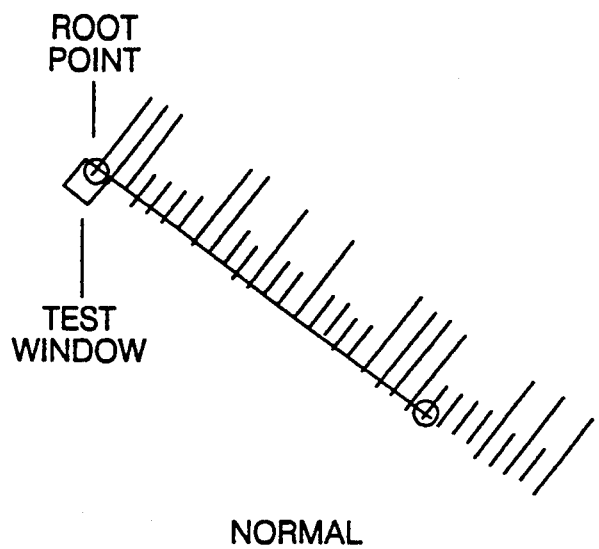
FIG. 8 illustrates a method to determine normal or reversal code, according to the present invention.
Figure 8B:
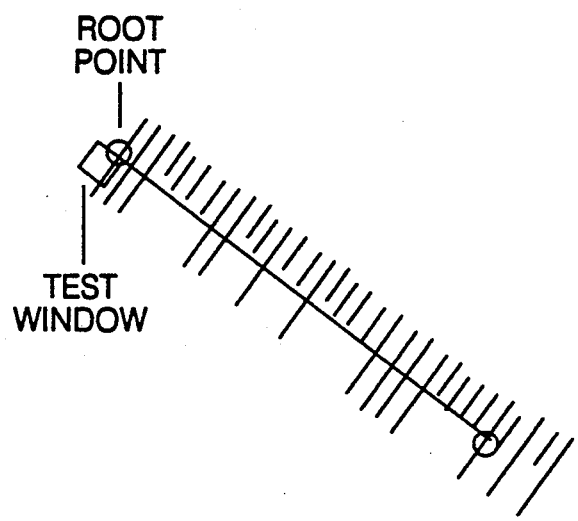

The Method to Determine Normal Decoding or Reversal Decoding for Postnet bar code Since a Postnet bar code is composed of tall bars and short bars, it is important to distinguish between right-side up and upside down Postnet bar codes. For the right-side up code such as shown in FIGS. 2a and 2c, we decode it in the normal way (from left to right). For the upside down code, we decode it in the reverse order (from right to left). The determination of normal decoding or reversal decoding is based on an evaluation of the distance between the root point and one end of the bar including the root point, as shown in FIG. 8. If the distance is greater than a threshold, reversal code is present.

With forward scanning, accurate orientation can be obtained for FIG. 2(a) and (d). However, for the code shown in FIG. 2(b) and (c), the location may fail, and even if the location is successful, the orientation resulted from FIG. 2(b) and (c) may not be accurate. In contrast, with reverse scanning, accurate orientation can be obtained for FIG. 2(b) and (c) while the orientation obtained for FIG. 2(a) and (d) may not be reliable.

Figure 2D:
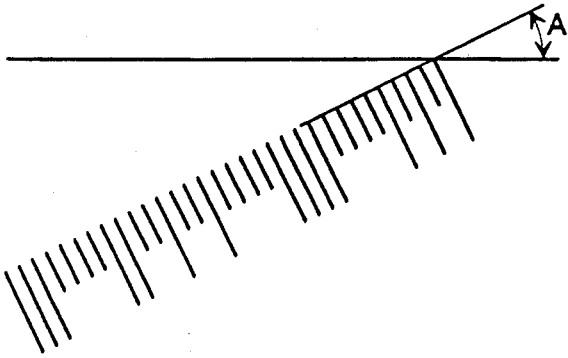

To speed the processing, an algorithm was designed to distinguish FIG. 2(a) and (b) (or FIG. 2(c) and 2(d)), to check if the code is a normal code or a reversal code. In the image coordinate system, FIG. 2(a) and (b) have negative slope and FIG. 2(c) and (d) have positive slope.

The determination of normal code or reversal code is illustrated in FIG. 8. The root point located in (a) is close to the bar code boundary; however, the root point located in (b) is inside the bar code. A distance calculation algorithm is applied between the root point and the end of the particular bar. If the distance between the root point and boundary is less than a threshold, the bar code is considered to be a normal code. Otherwise, it is a reversal code.

D. Location of Start Point and End Point and Fine Tune Orientation

Figure 9:
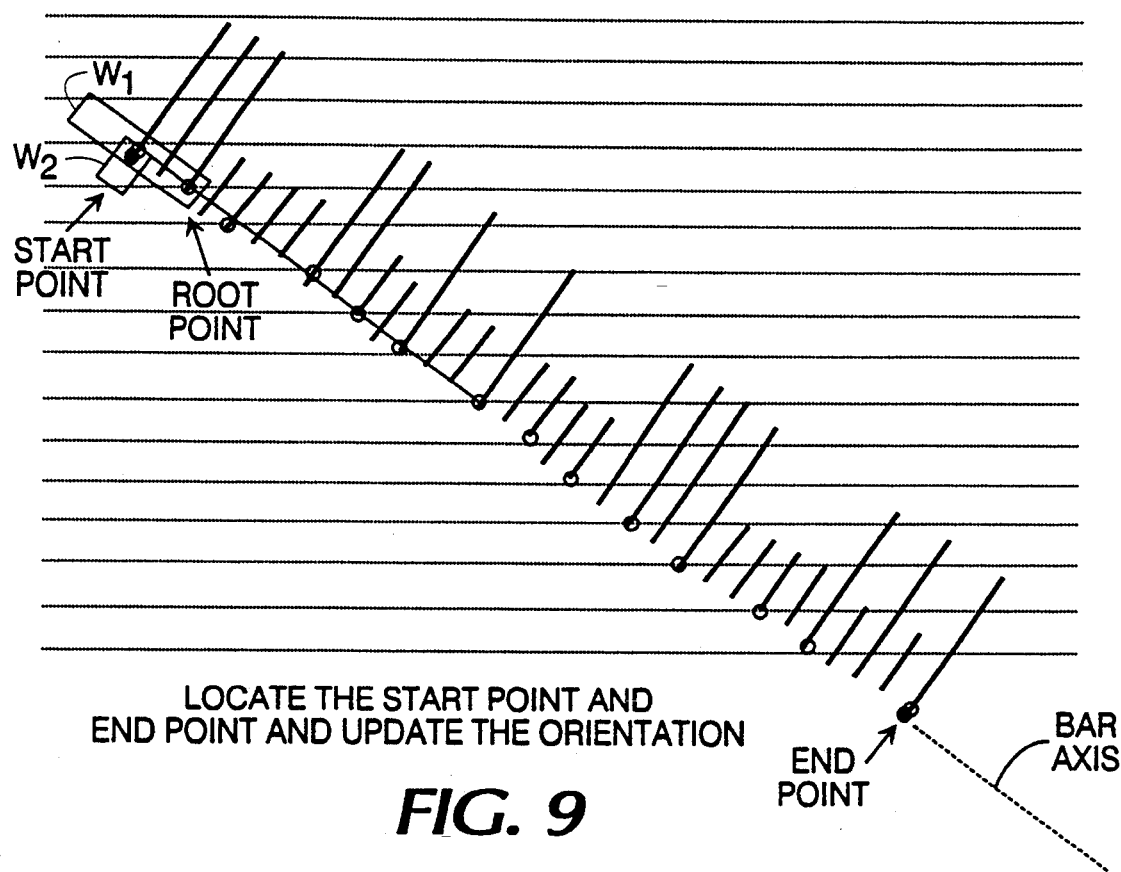
FIG. 9 illustrates a process for locating the start and end points of a Postnet bar code, according to the present invention. The start and end point lie on the Postnet bar code "bar axis" shown in dotted line.

After the root point is located and orientation is estimated, location of the start point and end point of the code is determined. FIG. 9 illustrates the method. Point A (not the start point) is obtained first by defining and searching (as known in the art) all information within an elongated window W1 which has the root point at one end and extends along the estimated slope of the candidate points. The goal is to determine if additional transitions (corresponding to bars) are present closer to the end of the code. If so, point A is defined and thereafter assumed to be on the leading bar of the code.

After point A has been defined, a second relatively thin window W2 is defined and completely searched as known in the art. This window is approximately the same width as the bar widths, has point A at one end and has its length extending along the leading bar as shown. By recognizing a transition area within the window, the start point may then be located and stored. The same procedure may be used to locate point B and the end point. That is, the last known candidate point may be used in the same manner as was the root point; by searching an elongated window (not shown) extending from the last known candidate point to the end of the code, the last bar may be found. The "bottom" of the bar (the end point) may be located by a process known in the art which locate such terminal points of bars. Instead of using the last known root point, a relatively longer window could also be drawn and searched having the start point at one end and follow the known slope of the code.

After the start point and end point are located, the orientation is recalculated as the slope of the line connecting the start point and end point. This update orientation value will highly improve the estimate of the orientation, especially for the cases of the very small orientation angle.

E. Verify Normal Decoding or Reversal Decoding

Figure 10:
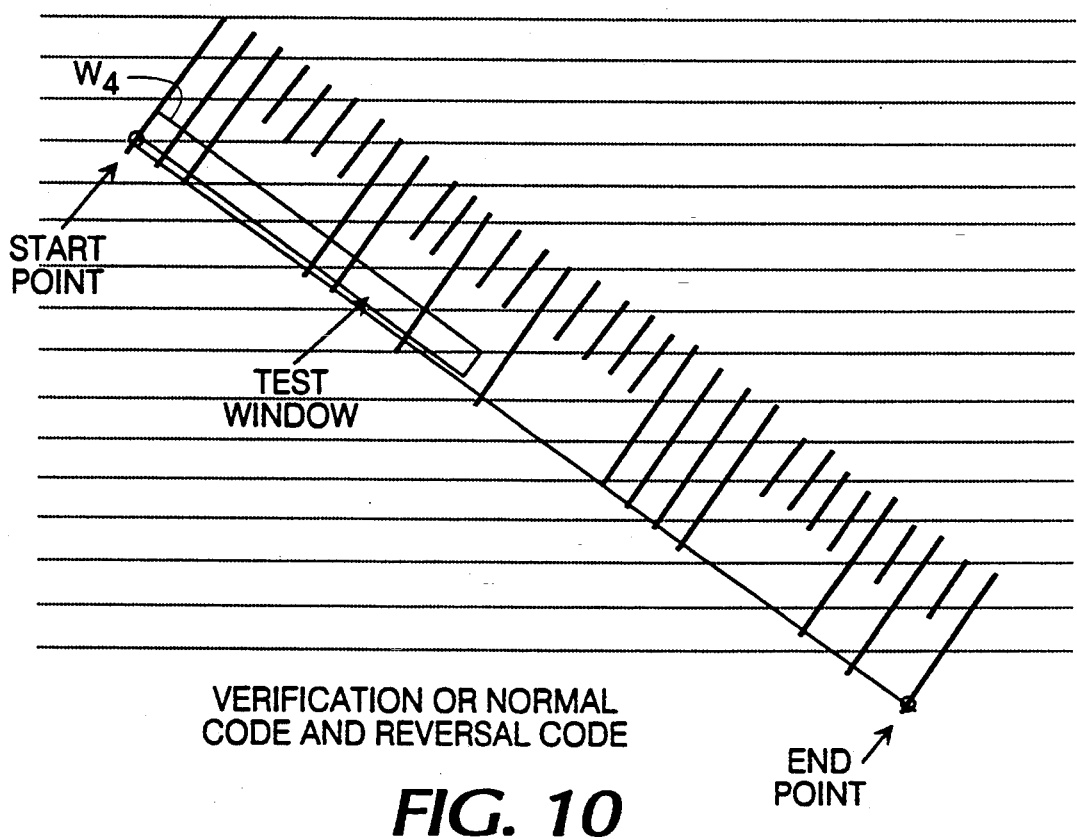
FIG. 10 illustrates a process for verifying normal or reversal code according to the present invention.

Sometimes, the assumption of normal code or reversal code as described above may provide a wrong result. FIG. 10 illustrates an example. If forward scan is assumed, the process could erroneously conclude that the code is a normal code and to be decoded from left to right. For correction, a verify routine has been designed as shown in FIG. 10. It counts the length of white run in a flat rectangular window right above the (erroneously) assumed "bottom" of the code between the start point and end point. If there is one white run which is larger than some threshold (say, two times of the largest bar transition length), then, we know it is one of the reversal codes, and the previous assumption of normal code was incorrect. Thus, when decoding, it is decoded from right to left. Otherwise, it is decoded from left to right.

F. Rotate and Project to Generate One-Dimensional Signal

After the start point, end point and orientation are determined, the process rotates the original image to provide a normalized bar code representation in that the image is now "viewed" as if it is horizontally aligned with the bottom of a rectangular projection window by knowledge of the start and end points, and slope. The process also provides a one-dimensional image of the normalized bar code by "intensity projection", as seen in FIG. 11. By scanning the pixel values of the image (which could be considered "fuzzy" as seen at line A) in the "projection direction" after setting the projection axis and window, a projection line is provided above a reference axis as shown in line B.

The location of each bar position is based on the following well known mathematical fact. If at some point, the first differential value is negative and the second differential value is positive, then this point is a local minimum. Therefore, the first differential of the signal in B is calculated as shown in line C. As may be understood, the "zero crossing points" derived from line C indicate that a bar exists. The determination of whether this is a tall bar or small bar is by setting a threshold which is not satisfied by the "small bar spikes", but is satisfied by the "tall bar spikes". Such information is easily convened to a binary signal as shown in line E.

Reference is made to FIG. 14A and 14B to describe a particular decoding process. Column W illustrates the "first differential" signal such as shown in line C of FIG. 11.

Figure 15:
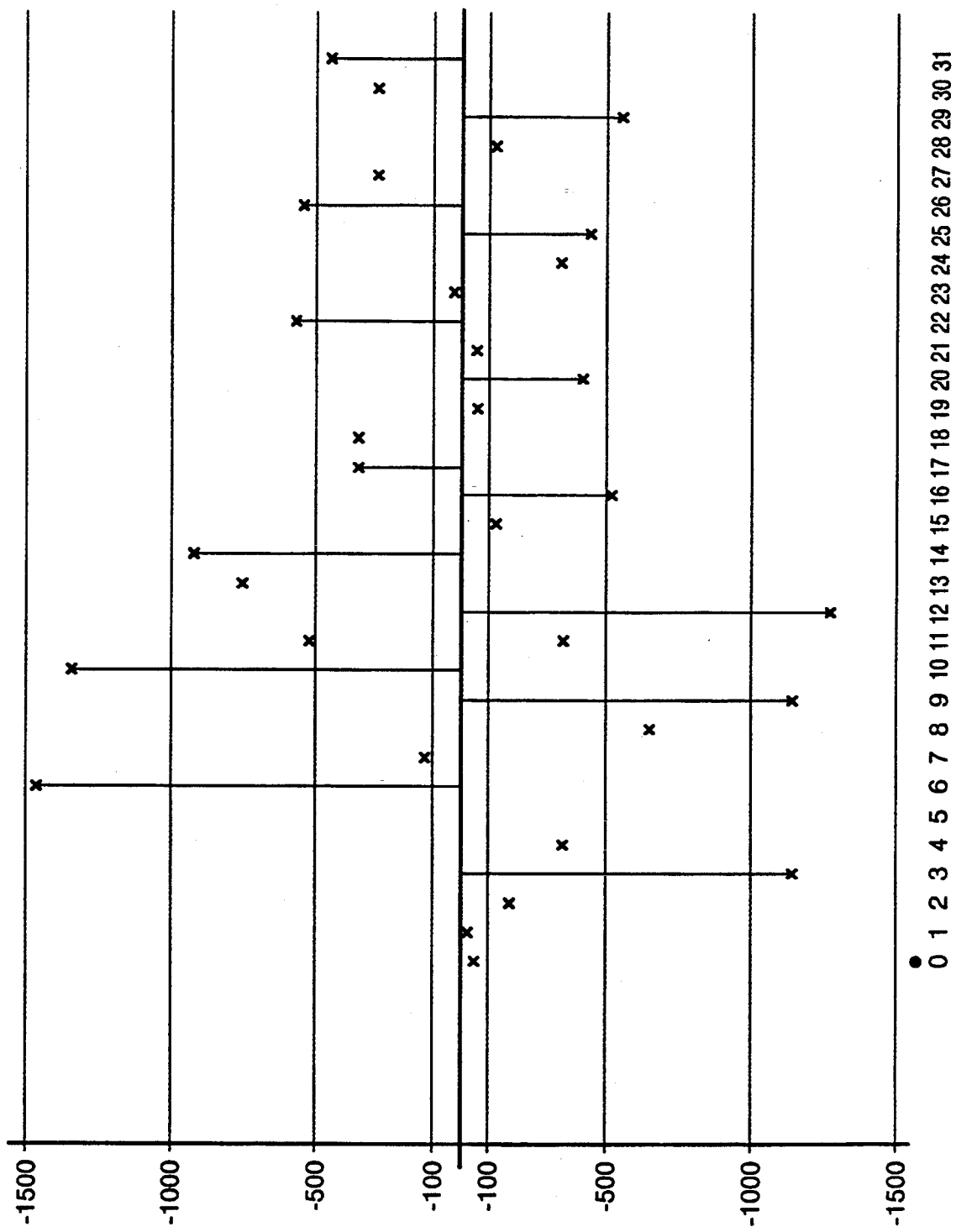
FIG. 15 is a chart plotting values in column W of FIG. 14A.

Reference is now also made to FIG. 15, which is a plot of valves from column W of FIG. 14A. The values shown in W are grouped into local groups according to positive or negative value, and taking the maximum absolute value from that group. By comparing the absolute valve of the differences between sequential pairs of values in Column X and comparing this difference to a threshold of, for example, 1800, large or small bars may be identified. For example the calculation:

$-1140-(1466)=-2606$ results in a tall bar designation.

G. Decoding and Error Checking

Decoding the Postnet bar code

The coding part is carried as follows. For each digit represented by 5 bars, a 5 element array z[1] (i=0–5) stores the bar weights which is 1 corresponding to tall bar and 0 corresponding to short bar. As mentioned earlier, the position weights are 7, 4, 2, 1, 0 respectively. The value of the digits can be calculated by:

ZIP digit+z[0]*7+z[1]*4+z[2]*2+z[3]*1+z[4]*0

After all the digits (including the check digit) become available, sum them together. If the result can be divided by 10, then the decoding is successful. Otherwise, the decoded ZIP information may be wrong and has be to checked manually.

Figure 6:
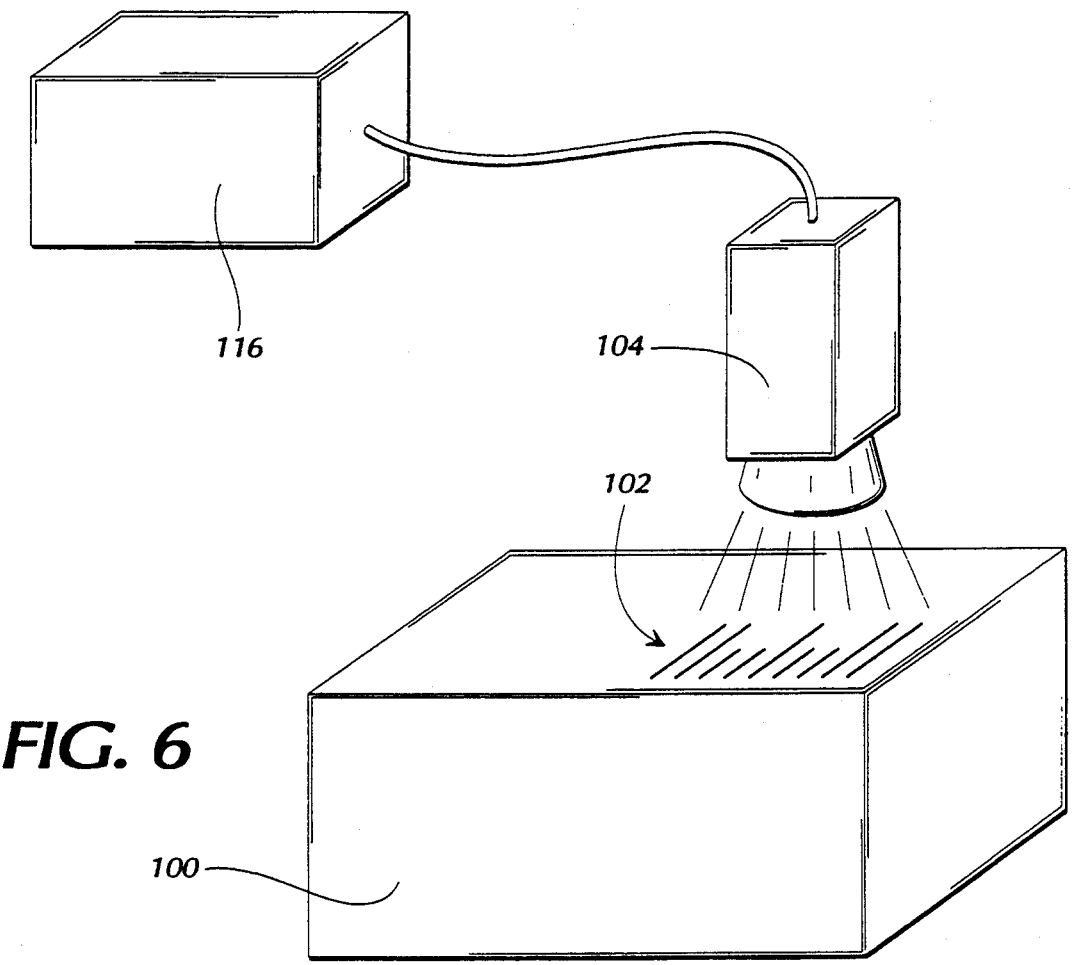
FIG. 6 is a illustrative view of a package 100 having a Postnet code 102 on its upper surface in the view of a camera 104 linked to a processing computer 106 having a processor portion and a memory portion.

Referring to FIG. 6, a package 100 having a Postnet code 102 on its upper surface is in the view range of a camera 104 linked to a processing computer 106. The hardware which may be used is a PULNIX TM-7CN camera coupled with a DIPIX P360 Power Grabber board with a TMS-C30 DSP processor.

While this invention has been described in specific detail with reference to the disclosed embodiments, it will be understood that many variations and modifications may be effected within the spirit and scope of the invention as described in the appended claims.

What is claimed is:

1. A method for optically reading and decoding a Postnet bar code symbol from a two dimensional digital input image representative of said Postnet bar code symbol, said two dimensional input image being comprised of gray scale pixel values received from a CCD sensor, said Postnet bar code having a bar axis being randomly oriented from parallel to approaching perpendicular relative to a scan direction and located on a two-dimensional substantially planar physical surface and including a plurality of substantially parallel spaced-apart tall and short bars with all bars extending in a common direction from said bar axis, said method comprising the steps of:

a) optically scanning line-by-line said two dimensional physical surface including said Postnet bar code with a CCD sensor in said scan direction along each line, said physical surface comprised of finite physical surface portions arranged in parallel rows of physical surface portions and parallel columns of physical surface portions, each of said physical surface portions being in one of said rows and also in one of said columns, said rows being substantially parallel to said scan direction;

b) storing data into computer memory as a two dimensional digital input image corresponding to said two dimensional surface, said two dimensional digital input image being comprised of individual gray scale pixel values received from said CCD sensor and each corresponding to one of said surface portions;

c) dividing said two dimensional digital input image into a plurality of non-overlapping elongated two-dimensional digital input image rows, each of which correspond to at least one row of said physical surface portions;

d) identifying one or more transition points within each of said digital input image rows by comparing adjacent pixel values within each of said digital input image rows, said transition point corresponding to at least one pixel;

e) identifying a candidate point within each of said digital input image rows by determining if a preselected number of transition points have a particular spaced-apart relationship within each of said digital input image rows, said spaced-apart relationship dependent upon the spacing of said tall and short bars; and f) estimating the slope of said bar code relative to said scan direction based upon the location of said candidate points.

2. The method as claimed in claim 1, further comprising the following steps after element "f":

g) locating the pixel values corresponding to the start and end points of the Postnet code; and h) recalculating the slope of the bar code relative to the scan direction by use of said start and end points.

3. The method as claimed in claim 2, wherein in step "c", said plurality of non-overlapping elongated two-dimensional digital input image rows are all spaced apart at least one row.

4. The method as claimed in claim 3, wherein in step "c", said plurality of non-overlapping elongated two-dimensional digital input image rows are all spaced apart at least one row in a manner to assure that each short bar creates at least one transition point regardless of code orientation relative to scanning.

5. The method as claimed in claim 1, wherein in step "c", said plurality of non-overlapping elongated two-dimensional digital input image rows are all spaced apart at least one row.

6. The method as claimed in claim 5, wherein in step "c", said plurality of non-overlapping elongated two-dimensional digital input image rows are all spaced apart at least one row in a manner to assure that each short bar creates at least one transition point regardless of code orientation relative to scanning.

7. A method for optically reading and decoding a Postnet bar code symbol from a two dimensional digital input image representative of said Postnet bar code symbol, said two dimensional input image being comprised of gray scale pixel values received from a CCD sensor, said Postnet bar code having a bar axis being randomly oriented from parallel to approaching perpendicular relative to a scan direction and located on a two-dimensional substantially planar physical surface and including a plurality of substantially parallel spaced-apart tall and short bars with all bars extending in a common direction from said bar axis, said method comprising the steps of:

a) optically scanning line-by-line said two dimensional physical surface including said Postnet bar code with a CCD sensor in a scan direction along said lines, said physical surface comprised of finite physical surface portions arranged in parallel rows of physical surface portions and parallel columns of physical surface portions, each of said physical surface portions being in one of said rows and also in one of said columns, said rows being substantially parallel to said scan direction;

b) storing data into computer memory as a two dimensional digital input image corresponding to said two dimensional surface, said two dimensional digital input image being comprised of individual gray scale pixel values received from said CCD sensor and each corresponding to one of said surface portions;

c) dividing said two dimensional digital input image into a plurality of non-overlapping elongated two-dimensional digital input image rows, each of which correspond to at least one row of said physical surface portions;

d) assuming said bar axis is oriented relative to said scan direction at a first assumed slope less than 45 degrees;

e) identifying one or more transition points within each of said digital input image rows by comparing adjacent pixel values within each of said digital input image rows, said transition point corresponding to at least one pixel;

f) identifying a candidate point within each of said digital input image rows by determining if a preselected number of transition points have a particular spaced-apart relationship within each of said digital input image rows, said spaced-apart relationship dependent upon the spacing of said tall and short bars; and g) determining if the number of candidate points correspond to those expected for said first assumed slope set forth in step "d";

h) repeating steps "e" and "f" at least once while assuming a second, smaller, assumed slope if step "g" is unsatisfied; and i) if step "g" is satisfied, estimating the slope of said bar code relative to said scan direction based upon the location of said candidate points.

8. The method as claimed in claim 7, further comprising
the following steps after element "i":
g) locating the pixel values corresponding to the start and end points of the Postnet code; and
h) recalculating the slope of the bar code relative to the scan direction by use of said start and end points.

9. The method as claimed in claim 8, wherein in step "c", said plurality of non-overlapping elongated two-dimensional digital input image rows are all spaced apart at least one row.

10. The method as claimed in claim 9, wherein in step "c", said plurality of non-overlapping elongated two-dimensional digital input image rows are all spaced apart at least one row in a manner to assure that each short bar creates at least one transition point regardless of code orientation relative to scanning.

11. The method as claimed in claim 7, wherein in step "c", said plurality of non-overlapping elongated two-dimensional digital input image rows are all spaced apart at least one row.

12. The method as claimed in claim 11, wherein in step "c", said plurality of non-overlapping elongated two-dimensional digital input image rows are all spaced apart at least one row in a manner to assure that each short bar creates at least one transition point regardless of code orientation relative to scanning.

13. A method for optically reading and decoding a Postnet bar code symbol from a two dimensional digital input image representative of said bar code symbol, said two dimensional input image being comprised of gray scale pixel values received from a CCD sensor, said Postnet bar code having a bar axis being randomly oriented from parallel to approaching perpendicular relative to a scan direction and located on a two-dimensional substantially planar physical surface and including a plurality of substantially parallel spaced-apart tall and short bars with all bars extending in a common direction from said bar axis, said method comprising the steps of:
a) optically scanning said two dimensional physical surface including said Postnet code with a CCD sensor in a scan direction, said physical surface comprised of finite physical surface portions arranged in parallel lines of physical surface portions and parallel columns of physical surface portions, each of said physical surface portions being in one of said rows and also in one of said columns, said columns being substantially parallel to said scan direction;
b) storing data into computer memory as a two dimensional digital input image corresponding to said two dimensional surface, said two dimensional digital input image being comprised of individual gray scale pixel values received from said CCD sensor and each corresponding to one of said surface portions;
c) dividing said two dimensional digital input image into a plurality of non-overlapping elongated two-dimensional digital input image rows, each of which correspond to at least one row of said physical surface portions;
d) identifying one or more transition points within each of said digital input image rows by comparing adjacent pixel values within each of said digital input image rows, said transition point corresponding to at least one pixel;
e) identifying a candidate point within each of said digital input image rows by determining if a preselected number of transition points have a particular spaced-apart relationship within each of said digital input image rows, said spaced-apart relationship dependent upon the spacing of said tall and short bars;
f) estimating the slope of said bar code relative to said scan direction based upon the location of said candidate points and establishing a slope line; and
g) determining of normal or reverse coding by checking the location said slope line intersects a particular Postnet bar relative to the ends of that bar.

14. The method as claimed in claim 13, further comprising the following steps after element "f":
g) locating the pixel values corresponding to the start and end points of the Postnet code; and
h) recalculating the slope of the bar code relative to the scan direction by use of said start and end points.

15. The method as claimed in claim 14, wherein in step "c", said plurality of non-overlapping elongated two-dimensional digital input image rows are all spaced apart at least one row.

16. The method as claimed in claim 15, wherein in step "c", said plurality of non-overlapping elongated two-dimensional digital input image rows are all spaced apart at least one row in a manner to assure that each short bar creates at least one transition point regardless of code orientation relative to scanning.

17. The method as claimed in claim 13, wherein in step "c", said plurality of non-overlapping elongated two-dimensional digital input image rows are all spaced apart at least one row.

18. The method as claimed in claim 17, wherein in step "c", said plurality of non-overlapping elongated two-dimensional digital input image rows are all spaced apart at least one row in a manner to assure that each short bar creates at least one transition point regardless of code orientation relative to scanning.

19. A method for decoding a bar code symbol oriented in a bar direction from a two dimensional digital input image representative of said bar code symbol, said two dimensional digital input image being comprised of gray scale pixel values received from a CCD sensor, said Postnet bar code having a bar axis being randomly oriented relative to a scan direction and located on a two-dimensional substantially planar physical surface and including a plurality of substantially parallel spaced-apart tall and short bars with all bars extending in a common direction from said bar axis, said method comprising the steps of:
a) dividing said two dimensional input image into a plurality of non-overlapping two dimensional sections, each of said two dimensional sections being bound by first and second reference lines substantially parallel to said bar direction and third and fourth reference lines substantially perpendicular to said bar direction, wherein said first, second, third and fourth reference lines are oriented omnidirectionally with respect to the rows and columns of pixels in said input image;
b) determining a plurality of intensity information values representative of the intensities of corresponding sections by summing pixel values derived from said input image lying in each of said sections;

c) forming a one-dimensional intensity projection signal by arranging said plurality of intensity information values along an axis, said one dimensional intensity projection signal having a plurality of corresponding peaks having differing heights;

d) determining the existence of a bar of the Postnet bar code and its relative length based upon a comparison of the relative heights of said peaks of said one dimensional intensity projection signal.

20. A method for decoding a bar code symbol oriented in a bar direction from a two dimensional digital input image representative of said bar code symbol, said two dimensional digital input image being comprised of gray scale pixel values received from a CCD sensor, said bar code symbol said Postnet bar code having a bar axis being randomly oriented relative to a scan direction and located on a two-dimensional substantially planar physical surface and including a plurality of substantially parallel spaced-apart tall and short bars with all bars extending in a common direction from said bar axis, said method comprising the steps of:

a) dividing said two dimensional input image into a plurality of non-overlapping two dimensional sections, each of said two dimensional sections being bound by first and second reference lines substantially parallel to said bar direction and third and fourth reference lines substantially perpendicular to said bar direction, wherein said first, second, third and fourth reference lines are oriented omnidirectionally with respect to the rows and columns of pixels in said input image;

b) determining a plurality of intensity information values representative of the intensities of corresponding sections by summing pixel values derived from said input image lying in each of said sections;

c) locally sorting said plurality of intensity information values by positivity or negativity to create a plurality of locally sorted groups each sharing either negative or positive intensity information values;

d) selecting from each group the intensity information value having the highest absolute value to create an ordered set of absolute values; and e) determining the existence of a bar of the Postnet bar code and its relative length based upon a comparison of adjacent absolute values within said set of absolute values.

21. An apparatus for optically reading and decoding a Postnet bar code symbol from a two dimensional digital input image representative of said Postnet bar code symbol, said two dimensional input image being comprised of gray scale pixel values received from a CCD sensor, said Postnet bar code having a bar axis being randomly oriented from parallel to approaching perpendicular relative to a scan direction and located on a two-dimensional substantially planar physical surface and including a plurality of substantially parallel spaced-apart tall and short bars with all bars extending in a common direction from said bar axis, said apparatus comprising:

a) a CCD sensor for optically scanning line-by-line said two dimensional physical surface including said Postnet bar code in said scan direction along each line, said physical surface comprised of finite physical surface portions arranged in parallel rows of physical surface portions and parallel columns of physical surface portions, each of said physical surface portions being in one of said rows and also in one of said columns, said rows being substantially parallel to said scan direction;

b) computer memory for storing data as a two dimensional digital input image corresponding to said two dimensional surface, said two dimensional digital input image being comprised of individual gray scale pixel values received from said CCD sensor and each corresponding to one of said surface portions;

c) a processor for dividing said two dimensional digital input image into a plurality of non-overlapping elongated two-dimensional digital input image rows, each of which correspond to at least one row of said physical surface portions;

d) a processor for identifying one or more transition points within each of said digital input image rows by comparing adjacent pixel values within each of said digital input image rows, said transition point corresponding to at least one pixel;

e) a processor for identifying a candidate point within each of said digital input image rows by determining if a preselected number of transition points have a particular spaced-apart relationship within each of said digital input image rows, said spaced-apart relationship dependent upon the spacing of said tall and short bars; and f) a processor for estimating the slope of said bar code relative to said scan direction based upon the location of said candidate points.

22. The apparatus as claimed in claim 21, further comprising:

g) a processor for locating the pixel values corresponding to the start and end points of the Postnet code; and h) a processor for recalculating the slope of the bar code relative to the scan direction by use of said start and end points.

23. The apparatus as claimed in claim 22, wherein in element "c", said plurality of non-overlapping elongated two-dimensional digital input image rows are all spaced apart at least one row.

24. The apparatus as claimed in claim 23, wherein in element "c", said plurality of non-overlapping elongated two-dimensional digital input image rows are all spaced apart at least one row in a manner to assure that each short bar creates at least one transition point regardless of code orientation relative to scanning.

25. The apparatus as claimed in claim 21, wherein in element "c", said plurality of non-overlapping elongated two-dimensional digital input image rows are all spaced apart at least one row.

26. The apparatus as claimed in claim 25, wherein in step "c", said plurality of non-overlapping elongated two-dimensional digital input image rows are all spaced apart at least one row in a manner to assure that each short bar creates at least one transition point regardless of code orientation relative to scanning.

27. An apparatus for optically reading and decoding a Postnet bar code symbol from a two dimensional digital input image representative of said Postnet bar code symbol, said two dimensional input image being comprised of gray scale pixel values received from a CCD sensor, said Postnet bar code having a bar axis being randomly oriented from parallel to approaching perpendicular relative to a scan direction and located on a two-dimensional substantially planar physical surface and including a plurality of substantially parallel spaced-apart tall and short bars with all bars extending in a common direction from said bar axis, said apparatus comprising:

a) a CCD sensor for optically scanning line-by-line said two dimensional physical surface including said Postnet bar code in a scan direction along said lines, said physical surface comprised of finite physical surface portions arranged in parallel rows of physical surface portions and parallel columns of physical surface portions, each of said physical surface portions being in one of said rows and also in one of said columns, said rows being substantially parallel to said scan direction;

b) computer memory for storing data as a two dimensional digital input image corresponding to said two dimensional surface, said two dimensional digital input image being comprised of individual gray scale pixel values received from said CCD sensor and each corresponding to one of said surface portions;

c) a processor for dividing said two dimensional digital input image into a plurality of non-overlapping elongated two-dimensional digital input image rows, each of which correspond to at least one row of said physical surface portions;

d) a processor for assuming said bar axis is oriented relative to said scan direction at a first assumed slope less than 45 degrees;

e) a processor for identifying one or more transition points within each of said digital input image rows by comparing adjacent pixel values within each of said digital input image rows, said transition point corresponding to at least one pixel;

f) a processor for identifying a candidate point within each of said digital input image rows by determining if a preselected number of transition points have a particular spaced-apart relationship within each of said digital input image rows, said spaced-apart relationship dependent upon the spacing of said tall and short bars; and g) a processor for determining if the number of candidate points correspond to those expected for said first assumed slope set forth in step "d";

h) a processor for repeating the processes in elements "e" and "f" at least once while assuming a second, smaller, assumed slope if step "g" is unsatisfied; and i) a processor used if step "g" is satisfied, estimating the slope of said bar code relative to said scan direction based upon the location of said candidate points.

28. The apparatus as claimed in claim 27, further comprising:

g) a processor for locating the pixel values corresponding to the start and end points of the Postnet code; and h) a processor for recalculating the slope of the bar code relative to the scan direction by use of said start and end points.

29. The apparatus as claimed in claim 28, wherein in element "c", said plurality of non-overlapping elongated two-dimensional digital input image rows are all spaced apart at least one row.

30. The apparatus as claimed in claim 29, wherein in element "c", said plurality of non-overlapping elongated two-dimensional digital input image rows are all spaced apart at least one row in a manner to assure that each short bar creates at least one transition point regardless of code orientation relative to scanning.

31. The apparatus as claimed in claim 27, wherein in element "c", said plurality of non-overlapping elongated two-dimensional digital input image rows are all spaced apart at least one row.

32. The apparatus as claimed in claim 31, wherein in element "c", said plurality of non-overlapping elongated two-dimensional digital input image rows are all spaced apart at least one row in a manner to assure that each short bar creates at least one transition point regardless of code orientation relative to scanning.

33. An apparatus for optically reading and decoding a Postnet bar code symbol from a two dimensional digital input image representative of said Postnet bar code symbol, said two dimensional input image being comprised of gray scale pixel values received from a CCD sensor, said Postnet bar code having a bar axis being randomly oriented from parallel to approaching perpendicular relative to a scan direction and located on a two-dimensional substantially planar physical surface and including a plurality of substantially parallel spaced-apart tall and short bars with all bars extending in a common direction from said bar axis, comprising:

a) a CCD sensor for optically scanning said two dimensional physical surface including said Postnet code in a scan direction, said physical surface comprised of finite physical surface portions arranged in parallel rows of physical surface portions and parallel columns of physical surface portions, each of said physical surface portions being in one of said rows and also in one of said columns, said columns being substantially parallel to said scan direction;

b) a processor for storing data into a two dimensional digital input image corresponding to said two dimensional surface, said two dimensional digital input image being comprised of individual gray scale pixel values received from said CCD sensor and each corresponding to one of said surface portions;

c) a processor for dividing said two dimensional digital input image into a plurality of non-overlapping elongated two-dimensional digital input image rows, each of which correspond to at least one row of said physical surface portions;

d) a processor for identifying one or more transition points within each of said digital input image rows by comparing adjacent pixel values within each of said digital input image rows, said transition point corresponding to at least one pixel;

e) a processor for identifying a candidate point within each of said digital input image rows by determining if a preselected number of transition points have a particular spaced-apart relationship within each of said digital input image rows, said spaced-apart relationship dependent upon the spacing of said tall and short bars;

f) a processor for estimating the slope of said bar code relative to said scan direction based upon the location of said candidate points and establishing a slope line; and g) a processor for determining of normal or reverse coding by checking the location said slope line intersects a particular Postnet bar relative to the ends of that bar.

34. The apparatus as claimed in claim 33, further comprising:

g) locating the pixel values corresponding to the start and end points of the Postnet code; and h) recalculating the slope of the bar code relative to the scan direction by use of said start and end points.

35. The apparatus as claimed in claim 34, wherein in element "c", said plurality of non-overlapping elongated two-dimensional digital input image rows are all spaced apart at least one row.

36. The apparatus as claimed in claim 35, wherein in element "c", said plurality of non-overlapping elongated two-dimensional digital input image rows are all spaced apart at least one row in a manner to assure that each short bar creates at least one transition point regardless of code orientation relative to scanning.

37. The apparatus as claimed in claim 33, wherein in element "c", said plurality of non-overlapping elongated two-dimensional dimensional digital input image rows are all spaced apart at least one row.

38. The apparatus as claimed in claim 37, wherein in element "c", said plurality of non-overlapping elongated two-dimensional digital input image rows are all spaced apart at least one row in a manner to assure that each short bar creates at least one transition point regardless of code orientation relative to scanning.

39. An apparatus for decoding a Postnet bar code symbol oriented in a bar direction from a two dimensional digital input image representative of said bar code symbol, said two dimensional digital input image being comprised of gray scale pixel values received from a CCD sensor, said Postnet bar code having a bar axis being randomly oriented relative to a scan direction and located on a two-dimensional substantially planar physical surface and including a plurality of substantially parallel spaced-apart tall and short bars with all bars extending in a common direction from said bar axis, comprising:

a) a processor for dividing said two dimensional input image into a plurality of non-overlapping two dimensional sections, each of said two dimensional sections being bound by first and second reference lines substantially parallel to said bar direction and third and fourth reference lines substantially perpendicular to said bar direction, wherein said first, second, third and fourth reference lines are oriented omnidirectionally with respect to the rows and columns of pixels in said input image;

b) a processor for determining a plurality of intensity information values representative of the intensities of corresponding sections by summing pixel values derived from said input image lying in each of said sections;

c) a processor for forming a one-dimensional intensity projection signal by arranging said plurality of intensity information values along an axis, said one dimensional intensity projection signal having a plurality of corresponding peaks having differing heights;

d) a processor for determining the existence of a bar of the Postnet bar code and its relative length based upon a comparison of the relative heights of said peaks of said one dimensional intensity projection signal.

40. An apparatus for decoding a Postnet bar code symbol oriented in a bar direction from a two dimensional digital input image representative of said bar code symbol, said two dimensional digital input image being comprised of gray scale pixel values received from a CCD sensor, said bar code symbol said Postnet bar code having a bar axis being randomly oriented relative to a scan direction and located on a two-dimensional substantially planar physical surface and including a plurality of substantially parallel spaced-apart tall and short bars with all bars extending in a common direction from said bar axis, comprising:

a) a processor for dividing said two dimensional input image into a plurality of non-overlapping two dimensional sections, each of said two dimensional sections being bound by first and second reference lines substantially parallel to said bar direction and third and fourth reference lines substantially perpendicular to said bar direction, wherein said first, second, third and fourth reference lines are oriented omnidirectionally with respect to the rows and columns of pixels in said input image;

b) a processor for determining a plurality of intensity information values representative of the intensities of corresponding sections by summing pixel values derived from said input image lying in each of said sections;

c) a processor for locally sorting said plurality of intensity information values by positivity or negativity to create a plurality of locally sorted groups each sharing either negative or positive intensity information values;

d) a processor for selecting from each group the intensity information value having the highest absolute value to create an ordered set of absolute values; and e) a processor for determining the existence of a bar of the Postnet bar code and its relative length based upon a comparison of adjacent absolute values within said set of absolute values.

* * * * *